United States Patent Office 2,716,612
Patented Aug. 30, 1955

2,716,612
COMPOSITION FOR SILICONE-TREATED ARTICLES

Lewis Marks, Jackson Heights, and Allison M. Stern, New York, N. Y., assignors to Polymer Industries, Inc., Astoria, N. Y., a corporation of Delaware No Drawing. Application August 28, 1951, Serial No. 244,102

4 Claims. (Cl. 106—146)

This invention relates to compositions for use in conjunction with silicone treated surfaces.

Where objects or surfaces have been covered or coated with silicone, they become resistant to the subsequent application of such adherent materials as adhesives, paints and the like. Thus, bottles which are dipped in silicone, in order to coat them internally, can not thereafter be supplied with a label which will adhere to it. Automobiles coated with silicone containing polish are difficult to repaint because of the resistance of the coating to adhesion and to removal by presently known means due to its chemical inertness.

Accordingly, it is an object of this invention to provide compositions which will destroy the adhesion resistant properties of silicones or organosiloxanes.

Another object of the present invention is to provide adhesive compositions capable of affixing objects to silicone-treated surfaces.

A further object of the present invention is to provide compositions which will permit the application of enamels, paints and the like upon surfaces which have been treated with silicone.

Another object of the present invention is to provide a method for labeling silicone-treated surfaces wherein the resistance of the surface to adhesion is destroyed in the same process which applies the label.

An object of the present invention is to provide an adhesive composition which will contain materials rendering silicone-treated surfaces adherable.

With these and other objects in view, the invention consists of the improvements hereinafter described and claimed.

As will be seen from the subjoined description, the invention is based upon the discovery that acidic fluorides, even in very low concentrations, possess the property of destroying the resistance of a silicone-treated surface to adhesion. Hydrogen fluoride, even when moderated and ameliorated by the presence of large quantities of viscous adhesive materials or thickening agents, has proven highly effective.

Other fluorides such as ammonium bifluoride (ammonium acid fluoride), amine bifluorides and sodium bifluoride, are very effective in overcoming the chemical inertness of the silicones and their adhesion resistance.

Alkaline fluorides have been found to be less active than those previously mentioned, but by adding acids to compositions containing alkaline fluorides, they may be rendered very efficient.

Thus, it is within the purview of this invention to employ any suitable material or materials which either contain hydrogen fluoride or which can form hydrogen fluoride in situ, in compositions for the treatment of silicone-coated surfaces.

One of the many applications of the present invention lies in the formulation of adhesives. Adhesive bases suitable for use in connection with the compositions may comprise: starch and its derivatives, including ethers, esters, oxidation derivatives, torrefaction products, enzyme conversion products, wet and dry conversion products, dextrines, fluidity starches, and unconverted starches of all kinds, such as potato, rice, corn, wheat, tapioca, waxy maize, waxy sorghum, sweet potato, rye and sago; flours such as corn, wheat, rye and barley; proteins such as animal glue, casein, wheat protein, soy protein, zein and gelatins and their derivatives; gums such as arabic, locust bean, tragacanth and karaya, and their derivatives; a very wide variety of synthetic resins, including polyvinyl acetate, polyvinyl chloride, and their copolymers, polyamides, amide-formaldehydes, phenolic-formaldehydes, polystyrenes, polyacrylates and polymethacrylates, ethoxylines, alkyds, polyesters and polyethylenes; synthetic rubbers and natural rubbers of all kinds, and their derivatives; cellulose and its derivatives, such as ethers and esters; rosin and its derivatives and related products, such as the gasoline-insoluble fraction of pine-wood resin; sugars and their derivatives; asphalts and tarry materials; pitches derived from fatty oils; linseed oil, factices, and other oily materials; and other adhesive bases, able to unite one surface with another.

Compositions prepared in accordance with the present invention may be made to assume a wide variety of forms. Thus the invention has been successfully applied in the form of aqueous solutions, aqueous dispersions, solvent solutions, hot-melt compositions and catalyst or heat-setting resinous compositions.

A specific example of an adhesive composition made under the present concept is as follows:

Example I 347 parts (by weight) water
650 parts (by weight) soluble yellow tapioca dextrine
3 parts (by weight) phenol
500 parts (by weight) 60% aqueous solution of hydrogen fluoride, commercial grade The water, dextrine and phenol are mixed and heated to near the boiling point. Stirring and heating are continued until the dextrine is well dispersed. The mixture is then cooled to room temperature. The 60% aqueous solution of hydrogen fluoride is then added to the viscous dextrine mixture. The finished mixture then may be applied in a thin film to the back of a foil, such as a label prior to securing the foil to a silicone coated surface.

Another suitable example of an adhesive composition, within the purview of the present invention, is the following:

Example II 343 parts (by weight) water
644 parts (by weight) soluble yellow tapioca dextrine
3 parts (by weight) phenol
10 parts (by weight) 60% aqueous solution of hydrogen fluoride The mixture is treated as in Example I.

Adhesives made in accordance with both Example I and Example II produced a bond between a label and a silicone surface, which prevented the removal of the label short of tearing. Labels applied to the silicone treated surface with a similar dextrine composition, but containing no hydrogen fluoride, fell off upon drying.

A third example of an adhesive within the purview of this invention is the following:

Example III 375 parts (by weight) water
250 parts (by weight) animal hide glue (190 gram strength)
75 parts (by weight) thiourea
20 parts (by weight) phosphoric acid (75% aqueous)

80 parts (by weight) of a mixture of 1 part ammonium bi-fluoride; 2 parts of water, and 1 part of 28% aqueous ammonia The thiourea is mixed with the water; the hide glue is then added and allowed to soften for several hours. The mixture is then warmed at 140° F. for two hours. The mixture is then cooled to 120° F. and the phosphoric acid added. At this point the mixture containing ammonium bi-fluoride is added.

A composition suitable for adhering material to silicone-treated surfaces, and particularly silicone-coated paper, may be made as follows:

*Example IV*

347 parts (by weight) water
650 parts (by weight) yellow soluble potato dextrine
3 parts (by weight) phenol
50 parts (by weight) sodium fluoride
40 parts (by weight) 75% aqueous phosphoric acid The water and dextrine are heated, as in Example I, cooled to room temperature and the sodium fluoride then added with agitation. The phosphoric acid is added last.

Silicone coated aluminum foil may be made to adhere to paper by the use of a composition prepared in the following manner:

*Example V*

Add to 100 parts (by weight) of water,
50 parts of 30% ammonium solution, and
50 parts of solid ammonium bi-fluoride Eight parts of this mixture are added to 100 parts of a 10% solution of polyvinyl alcohol, such as "Evanol 72-A-51" manufactured by E. I. du Pont de Nemours.

A specific example of an adhesive composition, made in accordance with the present invention, and which will adhere well to silicone-coated cloth is the following:

*Example VI*

920 parts (by weight) of an emulsion of polyvinyl acetate in water (Ex. Du Pont's 81-900)
50 parts (by weight) dibutyl phthalate
30 parts (by weight) 60% aqueos hydrofloric acid
These materials may be mixed cold.

A composition suitable for removing silicone from surfaces, such as automobile bodies and the like, may be provided by mixing:

*Example VII*

92.3 parts (by weight) of water
3.1 parts (by weight) Guar (a manno-galactan)
2.3 parts (by weight) ammonium bi-fluoride
2.3 parts (by weight) 28% ammonia It will be seen from the foregoing that compositions have been provided which will enable substances to be applied to silicone-treated surfaces, which compositions contain quantities of acidic fluorides, not in excess of 35% total weight, which are relatively safe for handling purposes and use.

Having thus fully described the invention, what is claimed to be new and desired to be covered by Letters Patent of the United States, is:

1. A composition for adhering materials to silicone-treated surfaces consisting essentially of 347 parts of water, 650 parts of soluble yellow tapioca dextrine, 3 parts of phenol, and 500 parts of a 60% aqueous solution of hydrogen fluoride.

2. A composition for adhering materials to silicone-treated surfaces consisting essentially of 343 parts of water, 644 parts of soluble yellow tapioca dextrine, 3 parts of phenol, and 10 parts of a 60% aqueous solution of hydrogen fluoride.

3. A composition for adhering materials to silicone-treated surfaces comprising, 347 parts of water, 650 parts of yellow soluble potato dextrine, 3 parts of phenol, 50 parts of sodium fluoride and 40 parts of a 75% aqueous phosphoric acid.

4. A composition for adhering materials to silicone-treated surfaces consisting essentially of 347 parts of water, 650 parts of a dextrine, 3 parts of phenol and 500 parts of an acidic water-soluble fluoride.

References Cited in the file of this patent

UNITED STATES PATENTS

| Number | Name | Date |
| --- | --- | --- |
| 254,263 | Bitterlin, Jr. | Feb. 28, 1882 |
| 1,470,772 | Simon | Oct. 16, 1923 |
| 1,471,466 | Hageman et al. | Oct. 23, 1923 |
| 2,118,386 | Swinehart | May 24, 1938 |
| 2,137,683 | Flaherty | Nov. 22, 1938 |
| 2,278,257 | Gallagher | Mar. 31, 1942 |
| 2,493,984 | McKay | Jan. 10, 1950 |